(12) United States Patent
Ghose et al.

(10) Patent No.: US 7,219,249 B1
(45) Date of Patent: May 15, 2007

(54) SYSTEM AND METHOD FOR REDUCING POWER REQUIREMENTS OF MICROPROCESSORS THROUGH DYNAMIC ALLOCATION OF DATAPATH RESOURCES

(75) Inventors: Kanad Ghose, Vestal, NY (US); Dmitry V. Ponomarev, Binghamton, NY (US); Gurhan Kucuk, Binghamton, NY (US)

(73) Assignee: The Research Foundation of State University of New York, Albany, NY (US)

( * ) Notice: Subject to any disclaimer, the term of this patent is extended or adjusted under 35 U.S.C. 154(b) by 559 days.

(21) Appl. No.: 10/727,105

(22) Filed: Dec. 3, 2003

Related U.S. Application Data

(60) Provisional application No. 60/431,425, filed on Dec. 3, 2002.

(51) Int. Cl.
*G06F 1/32* (2006.01)
(52) U.S. Cl. ..................... 713/324; 713/322
(58) Field of Classification Search ............... 713/300, 713/320, 322–324
See application file for complete search history.

(56) References Cited

U.S. PATENT DOCUMENTS

2002/0053038 A1* 5/2002 Buyuktosunoglu et al. . 713/320
2002/0174319 A1* 11/2002 Rivers et al. ............... 712/200

\* cited by examiner

*Primary Examiner*—Dennis M. Butler
(74) *Attorney, Agent, or Firm*—Milde & Hoffberg, LLP

(57) ABSTRACT

There is provided a system and methods for segmenting datapath resources such as reorder buffers, physical registers, instruction queues and load-store queues, etc. in a microprocessor so that their size may be dynamically expanded and contracted. This is accomplished by allocating and deallocating individual resource units to each resource based on sampled estimates of the instantaneous resource needs of the program running on the microprocessor. By keeping unused datapath resources to a minimum, power and energy savings are achieved by shutting off resource units that are not needed for sustaining the performance requirements of the running program. Leakage energy and switching energy and power are reduced using the described methods.

33 Claims, 7 Drawing Sheets

SYSTEM AND METHOD FOR REDUCING POWER REQUIREMENTS OF MICROPROCESSORS THROUGH DYNAMIC ALLOCATION OF DATAPATH RESOURCES

RELATED APPLICATIONS

This application claims priority in accordance with 37 C.F.R. §1.78 to Provisional Patent Application Ser. No. 60/431,425, filed Dec. 3, 2002, for which the priority date is claimed.

This invention was made with Government support under Agreement F30602-00-2-0525 awarded by the Air Force.

FIELD OF INVENTION

The present invention relates to reducing power requirements of microelectronic devices and, more particularly, to an apparatus and method for reducing power dissipation and energy requirements in high-performance microprocessors.

BACKGROUND OF THE INVENTION

Modern, high-performance microprocessors use sophisticated instruction scheduling mechanisms and pipelines designed to reorder the startup and completion of instructions in a sequential instruction stream so as to achieve a high-level of processor performance. One common form of such mechanisms is a superscalar microprocessor that is capable of fetching, decoding, issuing, executing, completing and retiring more than one instruction within a single cycle of the clock signal used to synchronize activities at the lowest level in the microprocessor. As used hereinbelow, the term instruction refers to the smallest unit of work that is scheduled independently within a microprocessor.

In a typical superscalar microprocessor, instructions are fetched from an instruction cache (I-cache) in program order along the predicted path of execution. The instructions are then decoded to resolve inter-instruction dependencies and are then dispatched into a buffer commonly known as the issue queue (IQ). Then, subject to both the availability of execution units (also called function units or FUs), and the input operands of the instruction, each instruction is eventually executed.

Instructions that are ready for execution, issued from the IQ to the chosen FU, may therefore start as well as finish execution out of program order. To comply with the sequential semantics of the executing program, the processor state as defined by the contents of the committed or architectural registers, as well as the state of the memory, must be updated in program order despite the fact that instructions can complete out of program order. This requirement is met by collecting the results produced out-of-program-order into another buffer called the reorder buffer (ROB). Information stored in the ROB is used to update the processor and memory state into the original program order.

As instructions are decoded in program order, an entry is simultaneously established in program order in the ROB, which behaves as a first-in, first-out (FIFO) queue. At the time of dispatch, the entry for the dispatched instruction is made at the tail of the ROB. The ROB entry for an instruction can itself serve as the repository of the instruction's results or it may point to the repository of the results within a separate physical register file.

The process of retiring or committing an instruction involves updating the processor's state and/or the memory state in program order, typically using the information stored in the ROB. Instructions are retired from the head of the ROB. If the ROB entry at the head of the ROB is awaiting the completion of the corresponding instruction, instruction retirement is blocked (i.e., halted) momentarily until the results are correctly produced.

To process load and store instructions that move data between memory locations and registers, many modern microprocessors also employ a load-store queue (LSQ), which also behaves as a FIFO queue. Entries are established for load and store instructions in program order as the instructions are dispatched, at the tail of the LSQ. Memory operations are started from the LSQ to conform to program ordering.

In modern microprocessor systems, the overall design strategy has heretofore been a "one-size-fits-all" approach, where the datapath resources like the IQ, ROB, registers and LSQ are set at predetermined, fixed sizes irrespective of the changes in the instantaneous needs of am executing program for these resources. As a result, these resources frequently remain under-utilized. Unused portions of the resources remain powered up, wasting energy and power.

DISCUSSION OF THE RELATED ART

Canal and Gonzalez ("A low-complexity issue logic", Proc. ACM Int'l. Conference on Supercomputing (ICS), pp. 327–335, Santa Fe, N.M., June, 2000) describe a scheme to reduce the complexity of the issue queue in a microprocessor. Their technique relies on the use of an additional queue, called the "ready queue" to hold instructions whose operands are determined to be available at the time of instruction dispatch. Instructions can be issued from this ready queue without the need to have energy-dissipating logic to check for the availability of operands. The present invention does not use any auxiliary structures to hold instructions and relies on the reduction of power in the issue queue by controlling the amount of resource units that are allocated for the issue queue. This scheme also makes use of an additional structure called the "first use" table to hold instructions that cannot be put into the "ready queue" at the time of instruction dispatching. With the use of this table and the associated logic, it is not clear that this scheme results in an overall power savings. Unlike the Canal et al. scheme, the present invention also reduces power dissipation within other datapath structures such as the reorder buffer, the load-store queue and the register file.

Folegnani and Gonzalez ("Energy-Effective Issue Logic", in Proceedings of the Int'l Symposium on Computer Architecture, June 2001, pp. 230–239) describe a FIFO issue queue that permitted out-of-order issue but avoided the compaction of vacated entries within the valid region of the queue to save power. The queue was divided into regions. The number of instructions committed from the most-recently allocated issue queue region in FIFO order (called the "youngest region") was used to determine the number of regions within the circular buffer that was allocated for the actual extent of the issue queue. To avoid a performance hit, the number of regions allocated was incremented by one periodically; in-between, also at periodic intervals, a region was deactivated to save energy/power if the number of commits from the current youngest region was below a threshold. The energy overhead of the control logic for doing this resizing was not made clear. Additional energy savings were documented by not activating forwarding comparators within entries that are ready for issue or entries that are unallocated. The scheme of Folegnani et al. is thus limited to a FIFO style issue queue design and does nothing to reduce power dissipation in other datapath structures such as the reorder buffer, the load-store queue and the register file. The present invention is applicable to more general styles of issue queue design, including FIFO issue queues. This invention also reduces power dissipations in the reorder buffer, the load-store queue and the register file. Furthermore, unlike the method of the present invention, the scheme of Folegnani et al. relies on continuous measurements of issue queue activity rather than sampled measurements.

Bahar and Manne ("Power and Energy Reduction Via Pipeline Balancing", Proceedings of the Int'l Symposium on Computer Architecture, June 2001, pp. 218–229) describe a scheme for shutting off clusters of execution units and some associated register files in the Compaq 21264 microprocessor based on continuous monitoring of the IPC. The dispatch rate was varied between 4, 6 and 8 to allow an unused cluster of function units to be shut off completely. The dispatch rate changes were triggered by the crossing of thresholds associated with the floating point and overall IPC (average number of instructions processed in a clock cycle), requiring dispatch monitoring on a cycle-by-cycle basis. Fixed thresholds were chosen from the empirical data that was generated experimentally. Significant power savings within the dynamic scheduling components were achieved with a minimum reduction of the IPC. The dynamic allocation of the reorder buffer—a major power sink—was left completely unexplored in this study. The scheme of Bahar et al. is limited to a clustered style microprocessor datapath and relies on continuous monitoring of performance. The present invention, on the other hand, saves power by controlling power dissipations within components smaller than clusters and also includes the reorder buffer, avoiding continuous monitoring of performance.

A portion of the dynamic resource management described in this invention was first described in the publication of Ponomarev, Kucuk and Ghose ("Reducing Power Requirements of Instruction Scheduling Through Dynamic Allocation of Multiple Datapath Resources", in Proceedings of the 34th International Symposium on Microarchitecture, December 2001, pp. 90–101). Since then, the scheme was extended by S. Dropsho, A. Buyuktosunoglu, R. Balasubramonian, et al., ("Integrating Adaptive On-chip Structures for Reduced Dynamic Power", in Proceedings of the International Conference on Parallel Architectures and Compilation Techniques (PACT), September 2002), where limited histogramming was used to control resource allocations instead of average queue sizes. Based on the presented results, it is difficult to see any obvious gains in terms of power/performance trade-offs between the method of the present invention and the scheme of Dropsho et al. It is certain, however, that the use of limited histogramming considerably complicates the control logic.

Buyuktosunoglu, Alper et al. (U.S. patent application No. 2002/0053038, May 2, 2002) describe a method and structure for reducing the power dissipation in a microprocessor that relies on dynamic resizing of at least one storage structure in a microprocessor. Unlike the method of Buyuktosunoglu et al., the present invention directly uses the lack of resource units (which indirectly affects performance) to allocate additional resource units to counter any performance drop arising from the lack of resources. The method of Buyuktosunoglu et al. uses the monitored value of the current IPC (average number of instructions processed in a clock cycle) and the prior measured value of IPC to reallocate additional units of the resized resource when a performance drop exceeds a predetermined threshold. However, the performance drop can be caused by reasons other than resizing, such as branch mispredictions and cache misses. Resource allocation is thus not always necessary when such performance drops are noticed. Furthermore, the present invention controls resource unit allocations for a variety of datapath artifacts such as the issue queue, the reorder buffer, the load-store queue and the register file simultaneously and independently to conserve power with minimal impact on performance. Buyuktosunoglu et al. focus on techniques that are driven solely by the activity of the issue queue. A further distinction of the present invention from Buyuktosunoglu et al. uses sampled, non-continuous measurements of usage of each resource that is controlled. Buyuktosunoglu et al. rely on continuous measurements of activity and performance, such as IPC.

As used hereinafter, the terms datapath resources or simply resources refers to the IQ, ROB, LSQ and register files, etc., but excludes the architectural register file (ARF). The term resource unit hereinafter refers to the basic unit of incremental resource which may be dynamically allocated or deallocated as required for execution of a particular instruction. The terms interval and period are used interchangeably herein.

Resource usage as used herein is defined by the actual number of valid entries, hereafter referred to as "occupancy".

The present invention is primarily intended for reducing dynamic power dissipation arising from switching activity in the microprocessor and similar devices. Power and energy dissipation arising from leakage in the resource units that are deallocated can also be reduced or avoided by using a variety of techniques known to those of skill in the circuit design arts, including, but not limited to, the use of sleep transistors, circuits using dual-threshold devices and substrate biasing.

SUMMARY OF THE INVENTION

In accordance with the present invention, there is provided an apparatus and method of dynamically estimating the instantaneous resource needs of a program running on a microprocessor. These estimates are used to allocate the minimum number of units of these resources to meet the instantaneous performance needs of that particular program. This approach requires that all allocatable resources be partitionable into independent allocation units that can be incrementally allocated or deallocated. For each of the datapath resources, unused resource units are shut off and isolated from the active, allocated units so as to reduce power dissipations resulting from leakage as well as from switching activities.

As the program's demands for each resource grow during program execution, further resource units may be independently allocated to each resource. Unused resource units may be reclaimed if the running program is not utilizing them. The reclaimed or deallocated resource units are powered down and isolated from the allocated units to maintain the instantaneous allocation levels at about the right level needed to meet the program's performance needs. The present invention comprises six key features:

1) The allocation and deallocation of each type of resource is controlled independently. This is because instantaneous requirements for one type of resource typically vary independently from requirements for a different resource (i.e., there is little, if any correlation between resource requirements). Decisions to deallocate resource units are made periodically, typically at the end of an update period whose duration is predetermined. Resource units may be added within an update period, as described in detail hereinbelow.

2) Estimates for the instantaneous need of a program for a specific resource type are obtained through multiple, periodic sampling within the update periods instead of continuous measurements on a cycle-by-cycle basis. The sampling period is predetermined or can be dynamically adjusted. The sampling frequency is typically a multiple of the update frequency.

3) At the end of the update period, unused resource units may be deallocated. The deallocation may be gradual, with only one resource unit deallocated at the end of a sampling period, or the deallocation can be more aggressive, with multiple unused resource units being deallocated at the end of the sampling interval. Deallocations typically coincide with the end of an update interval.

4) To avoid large penalties on performance, additional resource units are allocated as soon as the true instantaneous demands for the resource exceed the currently allocated units for a predetermined number of times within a sampling interval. When this happens, one or more resource units may be immediately allocated, as availability permits, and a new update period may then be started. Resource allocations thus do not necessarily coincide with the end of the periodic update interval.

5) As described in detail hereinbelow, units of certain resources that are organized as FIFO queues may have slightly different allocation and deallocation methods than other types of resources.

6) It is possible to use common sampling and update periods for all resources, but these intervals may also be chosen independently for each resource type.

Although the methods of the present invention are applicable to superscalar processors that utilize dynamic, hardware-implemented scheduling techniques, they may readily be extended to microprocessors that use a combination of static and dynamic scheduling techniques.

It is therefore an object of the invention to provide a microprocessor or similar microelectronic apparatus wherein various datapath resources may be dynamically sized.

It is an additional object of the invention to provide a microprocessor or similar microelectronic apparatus wherein various datapath resources are allocated and deallocated in increments.

It is a further object of the invention to provide a microprocessor or similar microelectronic apparatus wherein various datapath resources are allocated and deallocated dynamically, responsive to the needs for a particular resource by a particular program being executed.

It is yet another object of the invention to provide a microprocessor or similar microelectronic apparatus wherein resource units may be allocated one-at-a time or, if needed, may be allocated more than one-at-a-time.

It is an additional object of the invention to provide a microprocessor or similar microelectronic apparatus wherein datapath resources are allocated in accordance with statistics gathered during sampling periods.

BRIEF DESCRIPTION OF THE DRAWINGS

A complete understanding of the present invention may be obtained by reference to the accompanying drawings, when considered in conjunction with the detailed description, in which.

DESCRIPTION OF THE PREFERRED EMBODIMENT

The present invention provides a system that permits the power dissipation and energy requirements of a high-performance microprocessor to be reduced through the dynamic allocation and deallocation of datapath resources, with minimum impact on processor performance.

The present invention reduces dynamic power dissipation arising from switching activity in microprocessors and similar devices. Power and energy dissipation arising from leakage in the resource units that are deallocated can also be reduced or avoided by using a variety of techniques known to those of skill in the circuit design arts, including, but not limited to, the use of sleep transistors, circuits using dual-threshold devices and substrate biasing.

Figure 1:
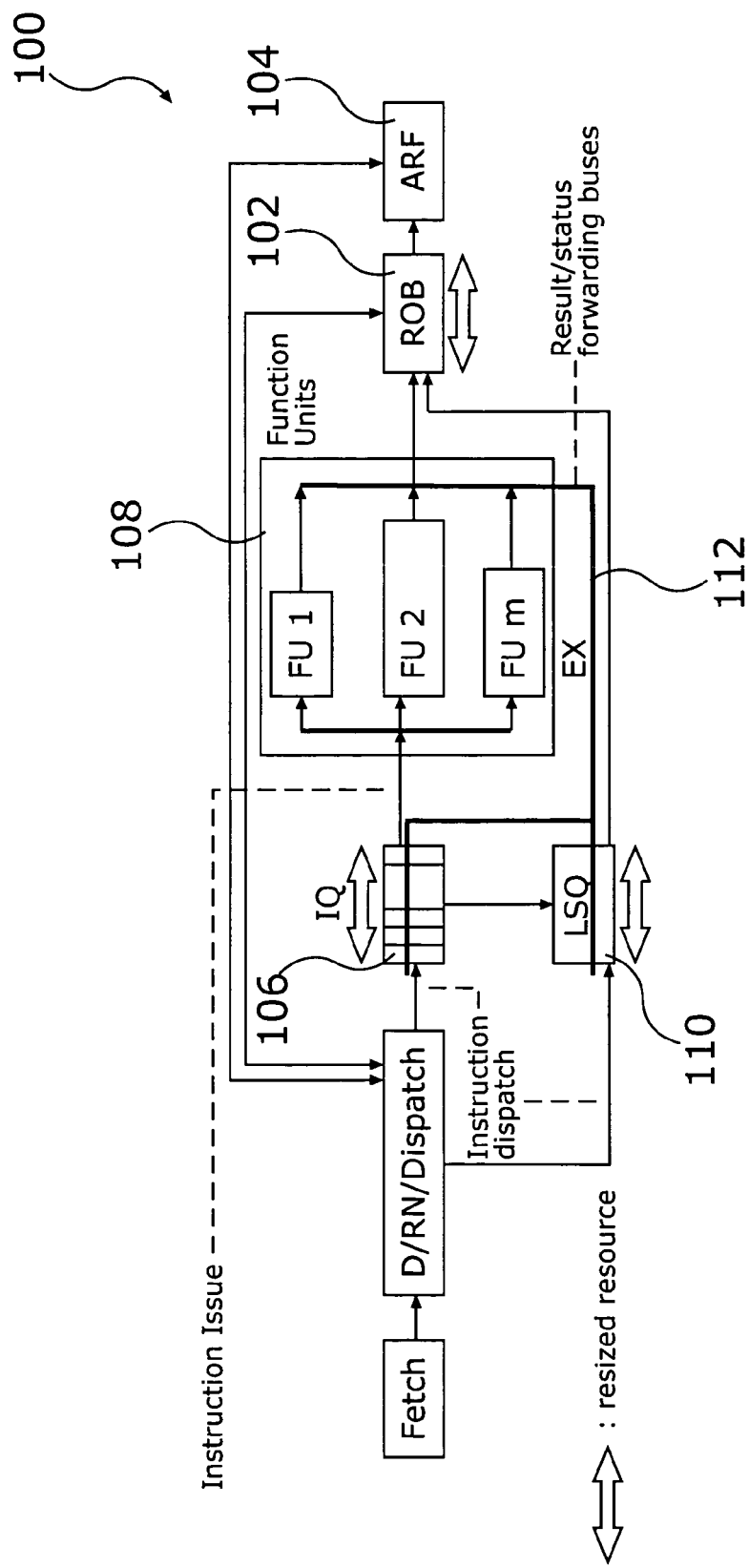
FIG. 1 is a schematic block diagram of an architecture of the datapath portion of a first superscalar processor wherein certain datapath resources may be dynamically resized in accordance with the invention.

Referring first to FIG. 1, there is shown a schematic block diagram of the datapath portion of a first superscalar microprocessor, generally at reference number 100. In the superscalar processor 100, a reorder buffer (ROB) 102 contains the ROB entry set up for an instruction at the time of dispatch. The ROB 102 entry also includes a field, not shown, to hold the result produced by the instruction. ROB 102 operates analogously to a physical register. If an operand value, not shown, has been committed, a dispatched instruction attempts to read operand values from the architectural register file (ARF) 104 directly. If, however, the operand value was generated but has not been committed, a dispatched instruction attempts to read the required operand associatively from the ROB 102 from the most recently established entry for an architectural register.

Source registers that contain valid data are read into the IQ 106 for the associated instruction. If a source operand is not available at the time of dispatch in the ARF 104 or the ROB 102, the address of the physical register (i.e., the ROB slot) is saved in the tag field associated with the source register in the IQ 106 for the instruction.

When a function unit 108 completes processing an instruction, it outputs the result produced along with the address of the destination register for this result. This result is placed on a forwarding bus 112 which runs across the length of the IQ 106 and the LSQ 110. An associative tag matching process is then used to steer the result to matching entries within the IQ 106. Since multiple function units 108 may complete processing their respective instructions within a particular cycle, multiple forwarding buses 112 are used. Each input operand field within an IQ 106 thus uses a comparator, not shown, for each forwarding bus 112. Alternative designs use a scoreboarding logic to identify the destinations of a forwarded result instead of using tag-based result forwarding.

For every instruction accessing memory, not shown, an entry is also reserved in the LSQ 110 at the time the instruction is dispatched. Because the address used by a load or a store instruction must be calculated, this instruction is removed from the IQ 106, even if the value to be stored (for store instructions) has not yet been computed. In this case, this value is forwarded to the appropriate LSQ 110 entry as it is generated by one of the function units 108.

In the datapath architecture of FIG. 1, the resources that are allocated and deallocated dynamically following the method of the present invention are: the IQ 106, the LSQ 110, and the ROB 102.

Figure 2:
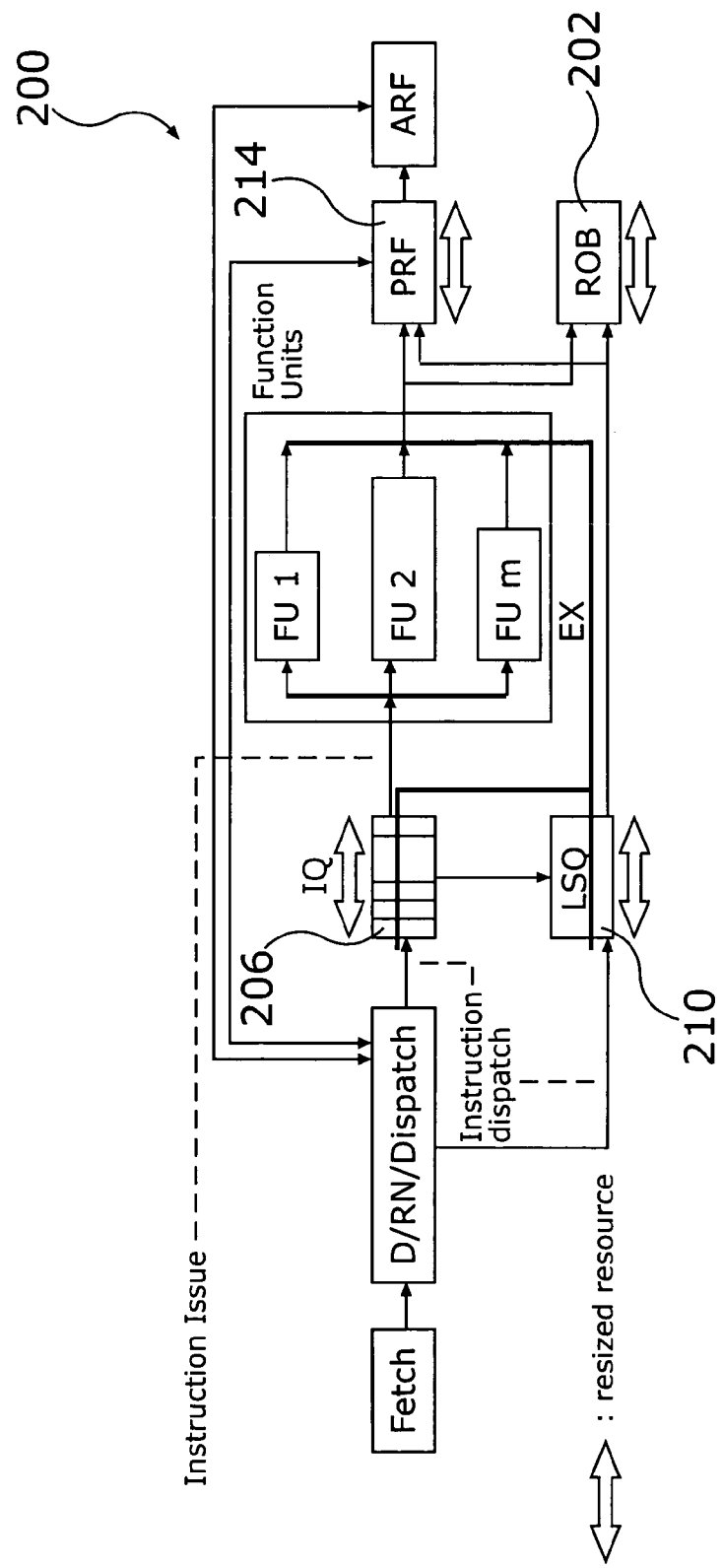
FIG. 2 is a schematic block diagram of an architecture of a datapath portion of a second superscalar processor wherein certain datapath resources may be dynamically resized.

The superscalar processor datapath 200 shown in FIG. 2 is similar to processor 100 (FIG. 1), with the difference that the destination registers are allocated within a separate physical register file (PRF) 214. In this case, at the time of dispatching an instruction, a physical register in PRF 214 is allocated for the instruction if its result is destined to a register. In addition, an entry is simultaneously established in ROB 202 for the instruction. The ROB 202 entry for the instruction holds a pointer, not shown, to the destination register of the instruction within the PRF 214. For processor 200, the PRF 214 may be managed exactly like a FIFO queue, similar to the ROB 202.

An alternative management scheme for the PRF 214 is also possible, requiring a list of allocated registers within the PRF 214 to be maintained.

In the datapath architecture of FIG. 2, the resources that may be allocated and deallocated dynamically following the method of the invention are: the IQ 206, the LSQ 210, the PRF 214, and the ROB 202.

Figure 3:
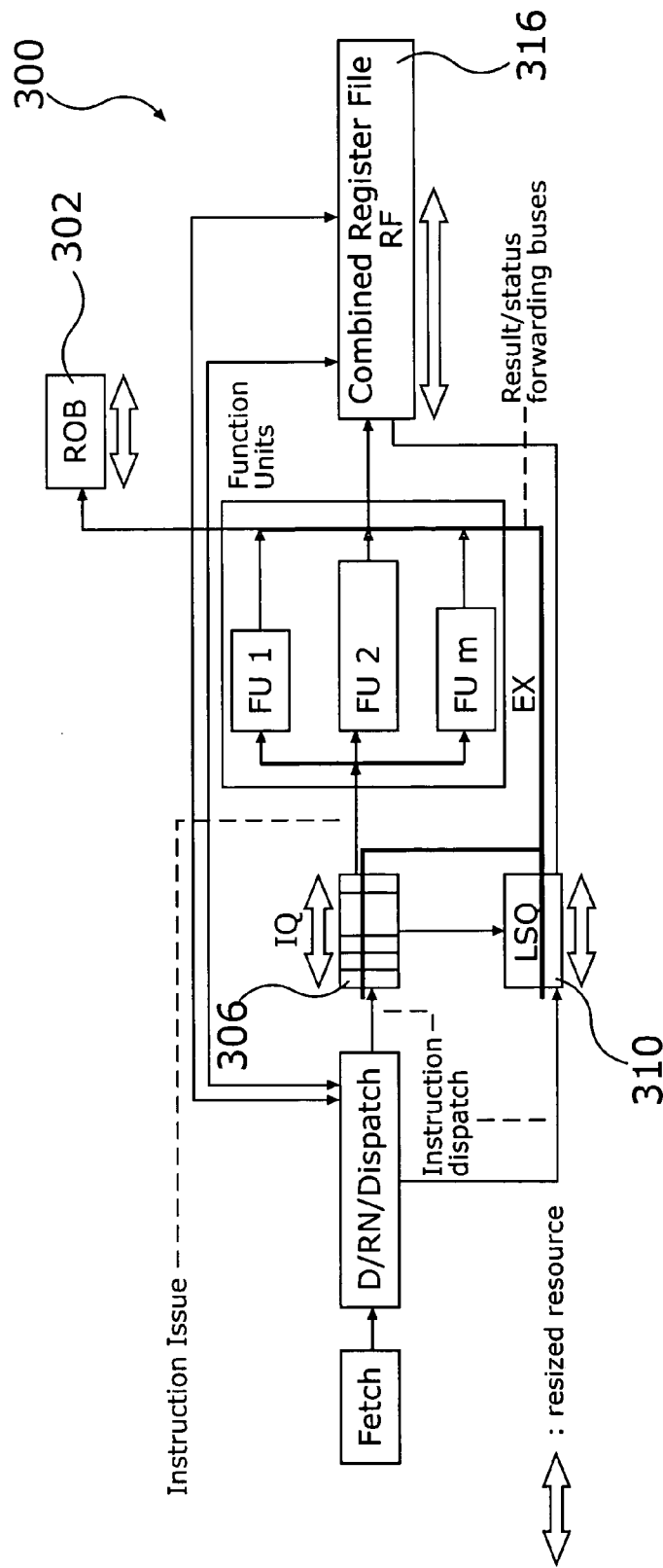
FIG. 3 is a schematic block diagram of an architecture of a datapath portion of a third superscalar processor wherein certain datapath resources may be dynamically resized in accordance with the invention.

FIG. 3 depicts the architecture of the datapath portion 300 of yet another superscalar microprocessor that can benefit from the method of present invention. In datapath 300, registers allocated to hold both committed register values and the results of instructions targeting a register, are held in a common register file, RF 316. A register alias table, not shown, may be used to point to committed register values within the RF 316. A similar table may be used to point to most recent instances of an architectural register within the RF 316 when register renaming is used to handle data dependencies.

In the datapath architecture of FIG. 3, the resources that may be allocated and deallocated dynamically following the method described in this invention are: the IQ 306, the LSQ 310, the RF 316, and the ROB 302.

In addition to application to the three datapath architectures depicted in FIGS. 1, 2 and 3, the method of the present invention may also be used in variations of these three architectures where all source register operands are read out at the time of issuing instructions to the function units. In each of these three datapath architectures and their variations, energy and power requirements are reduced using the inventive method by incrementally allocating and deallocating the resources as has been described.

The method of the present invention may also be applied to datapath architectures that are clustered or to architectures that use a distributed form of the IQ 106, 206, 306, called reservation stations.

In the inventive method, a predetermined number of units of each type of resource to be dynamically allocated and deallocated is initially allocated. A preset counter, not shown, or other suitable device is used to generate signals indicating the end of an update period. The same counter or a different counter may be used to generate signals that determine when resource usage is sampled. When resource units are added, this preset counter may be reset to begin a new update period.

In the preferred embodiment, all resources have a common predetermined update period and a common predetermined sampling period. Furthermore, both the update period and the sampling period are chosen to be powers of 2 in the number of clock cycles. It will be recognized that in alternate embodiments of the invention, variations using update and/or sampling periods specific to a resource type may be implemented. These alternate embodiments use sets of counters for generating signals to mark the end of such periods, typically one counter per resource.

To permit incremental allocation and deallocation of resources, the traditional monolithic forms of these resources are altered to segment each resource type into uniform-sized resource units. The size of each such resource unit is predetermined and is specific to each type of resource. For each resource type, a number of well-known circuit design techniques, such as multiple banking, bitline segmentation or partitioning with shared components can be used to implement: (i) the resource units themselves; (ii) facilities to add further units to an allocated suite of resource units, and (iii) facilities to deallocate certain already-allocated units.

As a program is run on the system initialized as described above, resource units are added (i.e., allocated) as the program requires a higher resource allocation to maintain its performance. If allocated resource units are determined to be unused at the end of an update period, they may be deallocated. The exact nature of the allocation and deallocation steps is described below.

Method for the Allocation of Non-Queue Resources

Figure 4:
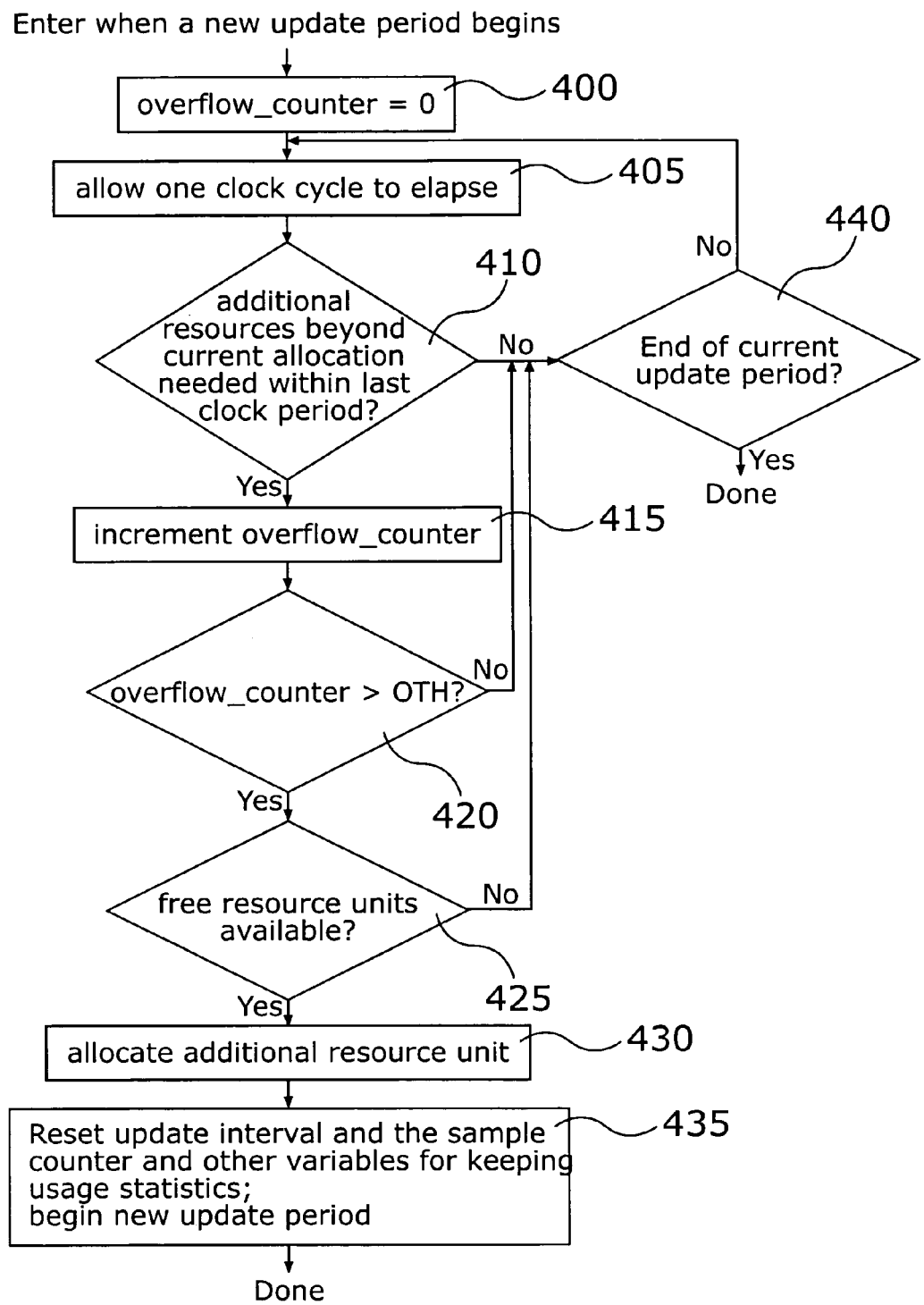
FIG. 4 is a flow chart of a method of allocating non-queued resources in accordance with the present invention.

Referring now to FIG. 4, there is shown a flow chart of one possible set of steps for allocating resources that do not behave like FIFO queues. Examples of such resources include, but are not limited to the register file (e.g., RF 316 of the datapath of FIG. 3), and non-collapsing issue queues, where IQ entries can be allocated or freed up at any position within the queue.

The process of allocating non-queued resources depicted in FIG. 4 begins with the commencement of an update period by initializing an overflow counter to zero, step 400. The overflow counter counts the number of times, since the update period started, that resources exceeding current allocations were required. For a non-collapsing IQ (e.g., IQ 306), when additional resources beyond the current allocations are needed but not allocated, instruction dispatch is blocked and performance suffers.

Next, one clock cycle is allowed to elapse, step 405, and then a check is performed, step 410, to determine if additional resources (beyond the current allocations) were required in the clock cycle that just elapsed. If additional resources were required, step 410, the value of the overflow counter is then incremented, step 415, and the process continues at step 420 where the overflow counter is checked to determine if its count has exceeded a predetermined threshold value, variable OTH.

If this comparison, step 420, indicates that the overflow counter has exceeded OTH, it is then necessary to check whether an additional free resource unit is available, step 425. If no additional free resource units are available, control is transferred to step 440. Otherwise a resource unit is allocated to increase the current resource allocation, step

430. After housekeeping tasks are performed, such as clearing variables and counters for keeping various statistics within an update period, and resetting the update period counter to begin a new update period, step 435, the process shown in FIG. 4 terminates.

If, however, additional resources are not required, step 410, program control is passed to step 440.

Likewise, if the overflow counter has not exceeded OTH, step 420, program control is returned to step 440.

In step 440, a check is performed to determine if the current update period has finished. If so, the process of FIG. 4 is terminated. If, however, the current update period has not yet completed, control is returned to step 405.

It will be recognized that the value of variable OTH may be specific to the type of resource. It is also possible to vary the value of variable OTH for a single resource over time. Although this does not occur in the embodiment chosen for purposes of disclosure, the present invention encompasses such an additional embodiment.

It will also be recognized that the process of FIG. 4 may be modified to allocate more than a single free allocation unit of a particular resource when the overflow counter exceeds OTH, step 420, early in the update cycle. Such a condition indicates a rapidly increasing demand for additional resources which, if not satisfied aggressively, may hurt overall performance. The present invention encompasses all such variations of additional free resource unit allocation.

Method for the Deallocation of Non-Queue Resources

Figure 5:
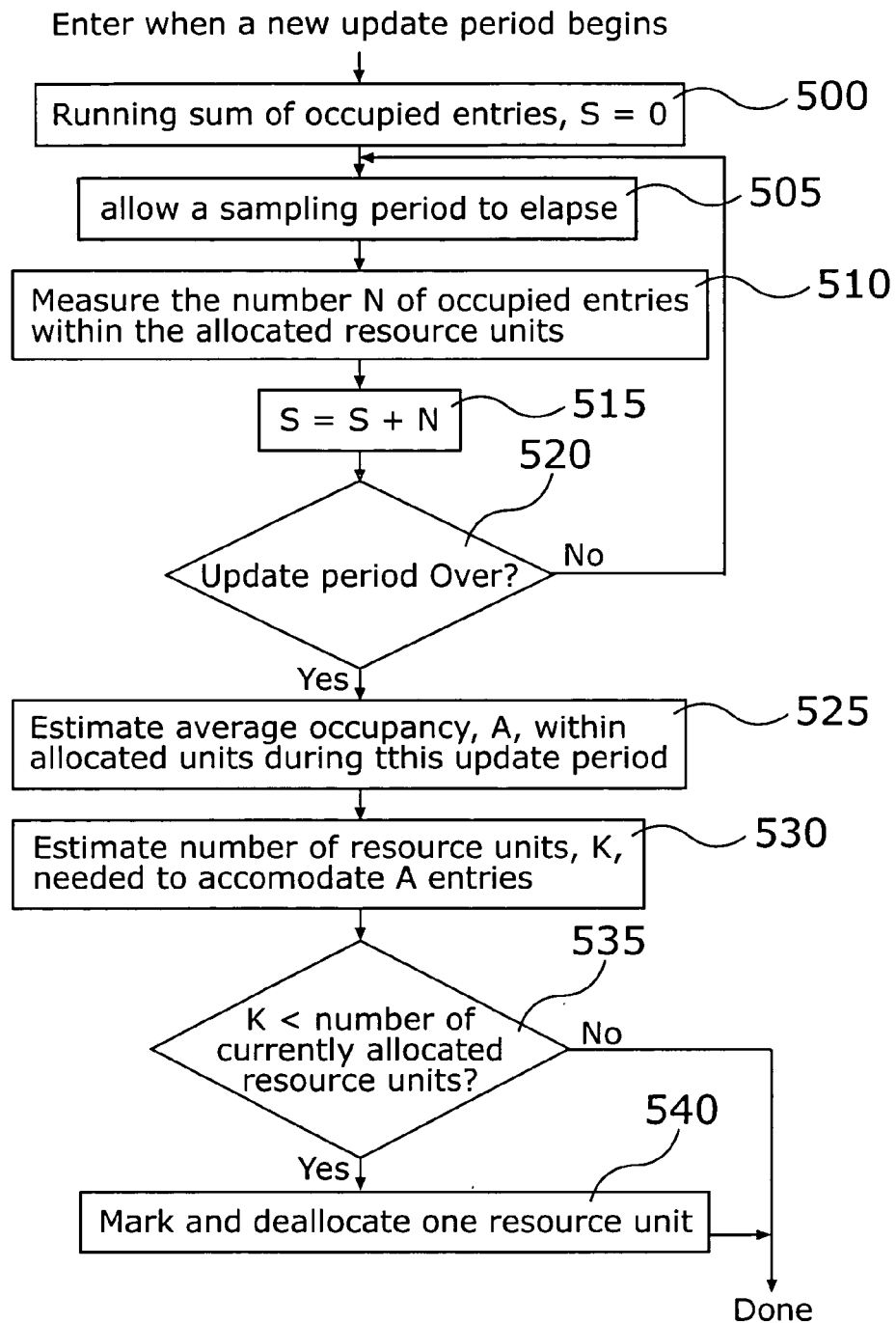
FIG. 5 is a flow chart of a method of deallocating non-queued resources.

Referring now to FIG. 5, there is shown a flow chart of one possible set of steps required to deallocate a resource of the type allocated according to the process of FIG. 4. This deallocation process commences when a new update period starts. First, a variable S maintains a running sum of samples usage estimates of the currently allocated resources and is initialized, step 500. Once variable S is initialized, a sampling period is allowed to elapse, step 505. At the end of the elapsed sampling period, the number of occupied entries within the allocated resource units is placed into a variable, N, step 510. In addition, the number of occupied entries within the allocated resource is also added to S, step 515. It should be noted that the term occupied entries refers to the number of allocated entries within the currently-allocated resource units.

At the end of a sampling interval, bit vectors indicating the occupancy status of the entries within each allocated unit may be created. Typically, such a bit vector contains a bit for every entry within a resource unit, with a 1 indicating an occupied entry and a 0 indicating a free entry. The sum of the number of 1s in each of these bit vectors may be estimated using known techniques to derive the total number of occupied entries within each allocated resource unit. The total number of occupied entries, N, may then be determined by adding up the already computed sums of the 1s in the bit vectors for the currently allocated resource units. For example, one possible way to perform such an estimate is to use replicated, parallel logic structures to estimate the sum of 1s in the aforesaid bit vectors and add them up using a fast tree adder to determine N.

At the end of a sampling interval, after updating S, step 515, control is transferred to step 520.

If the update period has not yet expired, step 520, control is returned to step 505. If, however, the update period is over, step 520, the average sampled occupancy, A, of the allocated resource units over the update period is estimated, step 525. If the update period and sampling period are both powers of 2 (as used in the embodiment chosen for purposes of this disclosure), determining this average occupancy, A, does not require any division; the division process is reduced to a simple operation that ignores some lower order bits in S.

Next, the number of resource units, K, required to accommodate the averaged number of occupied entries, A, is determined by dividing A by number of entries Q within each resource unit, and rounding the result up to the nearest higher integer, step 530. Again, a division step may be avoided by choosing Q to be a power of 2. It will be recognized that the value Q may be specific and different for each resource type.

Next, a check is performed to determine if K is smaller than the number of currently allocated resource units, step 535. If not, the process of FIG. 5 terminates. If, however, K is smaller than the number of currently allocated resource units, step 535, a single unit of resource is marked for deallocation, step 540, and the process of FIG. 5 terminates. The actual deallocation of this marked resource unit takes place when all occupied entries within this unit are consumed (i.e., vacated). No entries are allocated within the resource unit marked for deallocation. In a more aggressive deallocation scheme that emphasizes power/energy savings over performance, more than one allocated resource unit, up to a maximum of the difference between K and the number of currently allocated units, may be marked for deallocation and may eventually be deallocated.

General Usage of Resources Used Like a FIFO Queue

Figure 6:
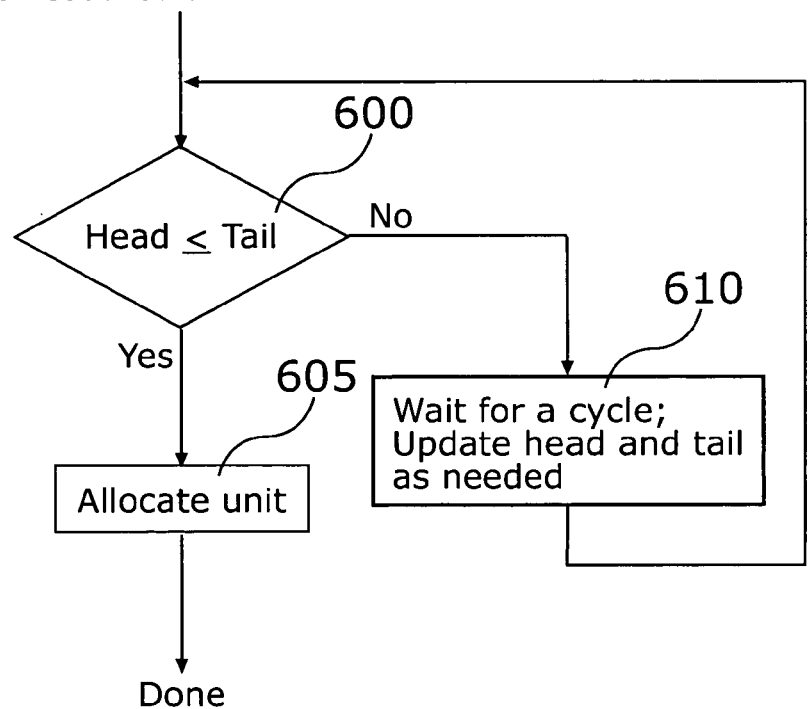
FIG. 6 is a flow chart of at set of steps associated with allocating resources used like a FIFO queue.

The dynamically allocated datapath resources that are used as a queue (such as the ROB, the LSQ and collapsing variations of IQs (FIGS. 1, 2, and/or 3) require special considerations for allocations and deallocations because of the circular nature of the FIFO queues. It may be assumed that such queue resources use two pointers, typically head and tail pointers to identify the two extremes of the circular queue. It may also be assumed that both these pointers are first initialized to zero, and then incremented, typically in a circular fashion, to permit wraparound, as the queue grows or shrinks. Hereinafter in the description of the FIFO resources and in related methods exemplified in the flow charts of FIGS. 6 and 7, all arithmetic operations and comparisons performed on the head and tail pointers of the queue take into account the implications of wrap-around. New entries are made at the end identified by tail pointer, after incrementing the tail pointer to point to the next empty entry. Entries are consumed (i.e., removed) from the head of the queue. More specifically, the entry pointed to by the head pointer is consumed and the value of the head is then incremented circularly to point to the next entry to be removed. For the ROB, establishing an entry at the tail of the queue corresponds to the creation of a ROB entry for an instruction at the time that it is dispatched. The consumption of a ROB entry using the head pointer corresponds to the act of retiring an instruction.

Typically, the resource units allocated to implement FIFO queues are physically adjacent; the queue structure is confined entirely within the allocated resource units. If a resource unit must be deallocated, the unit that is deallocated is the one that has entries with the highest index values. Likewise, when a new resource unit is added, the free unit added is the one adjacent to the currently allocated partition that has entries with the highest index value. The circular nature of these queues, which allow the queue to wrap around within the allocated resource units, adds some complication to the process of allocating and deallocating resource units.

Method for Allocating Resources Used Like a FIFO Queue

The decisions leading to the conclusion that additional resource units must be allocated to a resource used as a circular FIFO queue structure are substantially identical to those illustrated in the process of FIG. 4. However, step 430 is replaced with the multiple exemplary steps shown in the flow chart of FIG. 6. One significant difference is that the tail end of the FIFO queue should be able to extend into the newly allocated unit (i.e., wrap around).

The allocation process begins with determining if the value of the head pointer is less than or equal to the value of the current tail pointer, step 600. This is a normal comparison that ignores the consequences of circular increments to these pointers. This assumption is extended to all pointer comparisons discussed hereafter. If the value of the head pointer is less than or equal to the value of the current tail pointer, step 600, a free resource unit is added adjacent to the currently allocated resource unit having entries with the highest index values, step 605. If, however, the value of the head pointer is greater than the value of the current tail pointer, step 600, a cycle is allowed to elapse and the head and tail pointers are updated to reflect events therewithin, step 610. Control is then returned step 600.

Method for Deallocating Resources Used Like a FIFO Queue

The decisions leading to the conclusion that previously-allocated resource units may be deallocated in a resource used as a circular FIFO queue structure are substantially identical to those illustrated in the process of FIG. 5. However, step 540 must be replaced with the multiple exemplary steps shown in the flow chart of FIG. 7.

Several checks are needed before the resource unit that has entries with the highest index values among the allocated units can be deallocated:

a) As in the case of non-queue resources, deallocation cannot be considered until all entries currently within the unit marked for deallocation are consumed;

b) While the actual deallocation of the unit identified for deallocation is pending, the queue should not be allowed to grow back into that resource unit, and any event (e.g., instruction dispatching, in the case of the ROB) that causes the queue to grow like this should be suspended until the resource unit is deallocated; and c) The deallocation should be performed in a manner that allows the queue to wrap around, properly following the deallocation.

Figure 7:
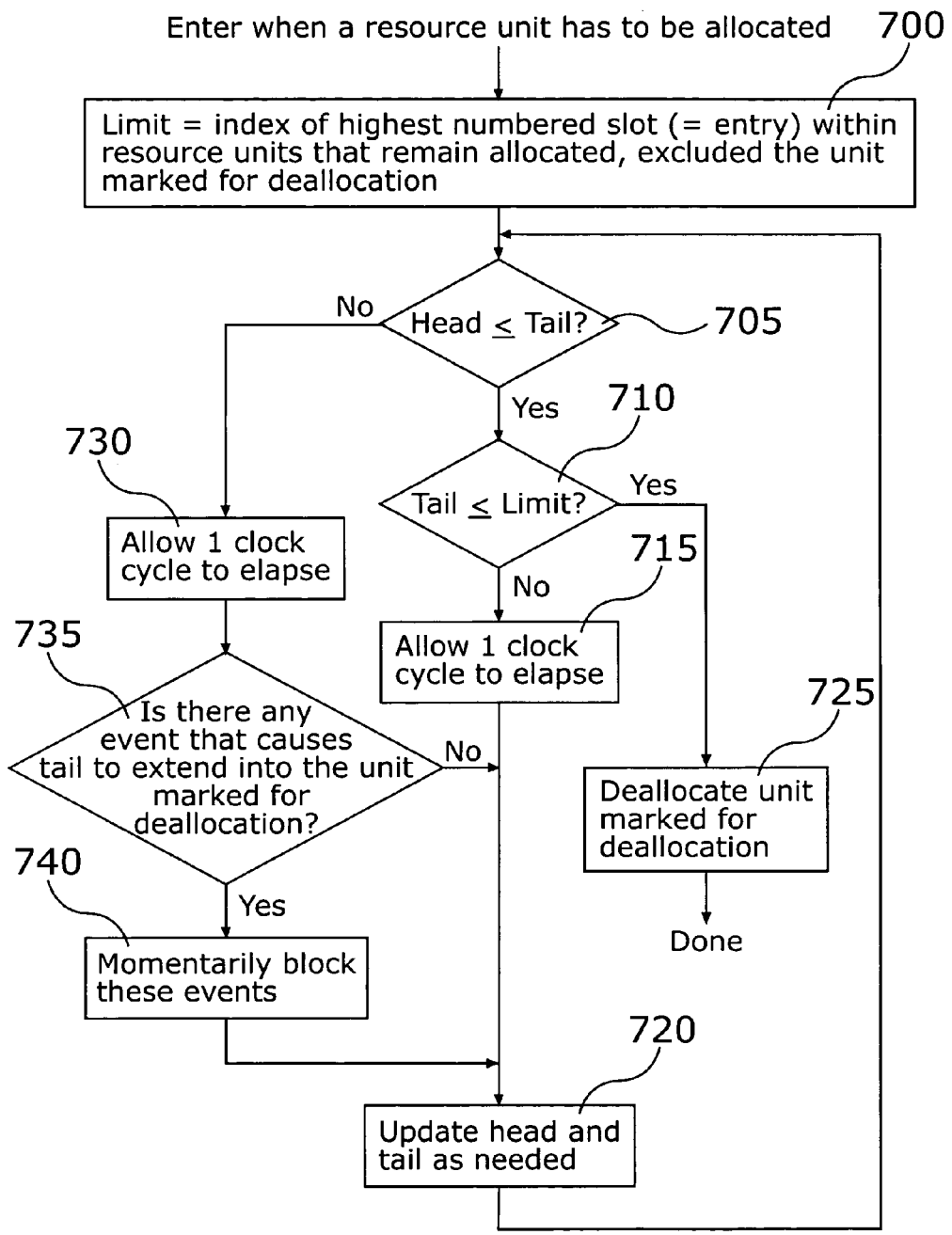
FIG. 7 is a flow chart of a set of steps associated with deallocating resources used like a FIFO queue.

The deallocation process of FIG. 7 begins by setting the variable Limit to the index of the highest numbered slot, step 700. This includes both allocated and unallocated entries within the resource units that are to remain allocated, but excludes resource units marked for deallocation.

Next, a test is performed to determine if the value of the head pointer is less than or equal to the value of the tail pointer, step 705.

If so, step 705, a test is performed to determine if the value of the tail pointer is less than or equal to that of the variable Limit, step 710. If this is true, the block marked for deallocation is actually deallocated, step 725, and the process of FIG. 7 terminates. If the test, step 710, is false, one clock cycle is allowed to elapse, step 715. If, however, the test, step 710, is false, then one clock pulse is allowed to elapse, step 715, and the head and tail pointers are updated as needed, step 720. Control is then transferred to step 705.

If, however, the value of the head pointer is greater than the value of the tail pointer, step 705, a single clock cycle is allowed to elapse, step 730. A test is then performed, step 735, to determine if any events in the upcoming clock cycle might cause the tail pointer to extend into the unit marked for deallocation. If any such event exists, it or they are momentarily blocked, step 740, and control is transferred to step 720. If no events in the upcoming clock cycle might cause the tail pointer to extend into the unit marked for deallocation, step 735, control is transferred directly to step 720.

It will be recognized by those skilled in the design of processor architecture that the two methods described above for handling the allocation and deallocation of resource units for resources that are used like a circular FIFO queues may be modified to permit the allocation and deallocation of more than one resource item at a time. Consequently, the present invention is not considered to be limited by the embodiment chosen for purposes of disclosure.

Some general aspects of these inventive methods should be noted. First, new resource units are typically allocated more rapidly than resource units are deallocated. This avoids noticeable performance degradation. Second, the actual deallocation of resource units for resources that are used like a circular FIFO queue can be delayed substantially until the conditions for deallocation are all valid. During this time, events such as instruction dispatching in the case of a ROB may also be momentarily blocked.

The size estimates developed using these disclose inventive methods may also be used to selectively control clock rates to at least one component of a datapath resource. Such components include an instruction cache, an execution unit, clusters of registers, and function units. It will be recognized that may other microprocessor components may well benefit from such selective clock rate control and the invention is not considered limited to these specifically disclosed components.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for reducing power requirements for a microprocessor, the steps comprising:
   a) providing within a microprocessor at least one datapath resource whose resource allocation may be dynamically altered;
   b) dynamically estimating a resource allocation requirement for said at least one datapath resource responsive to a need therefore by a program being executed within said microprocessor, comprising using sampled estimates of a usage for said at least one datapath resource by said program being executed;
   c) dynamically altering the resource allocation of said at least one datapath resource responsive to said resource allocation requirement estimate; and
   d) reducing power consumption from an unused portion of said at least one datapath resource.

2. The method for reducing power requirements for a microprocessor in accordance with claim 1, wherein said at least one datapath resource comprises discrete resource units.

3. The method for reducing power requirements for a microprocessor in accordance with claim 2, wherein said at least one datapath resource may have at least one of said discrete resource units allocated thereto and deallocated therefrom.

4. The method for reducing power requirements for a microprocessor in accordance with claim 1, wherein said sampled estimates comprises periodic measurement within at least one update period of said need for said at least one datapath resource by said program being executed.

5. The method for reducing power requirements for a microprocessor in accordance with claim 4, wherein said update period is dynamically determined.

6. The method for reducing power requirements for a microprocessor in accordance with claim 1, wherein said sampled estimates of said need for said at least one datapath resource are determined during an estimation interval.

7. The method for reducing power requirements for a microprocessor in accordance with claim 1, wherein said dynamically altering step (c) comprises at least one of the sub-steps: allocating at least one additional discrete resource unit to said at least one datapath resource, and deallocating at least one discrete resource unit from said at least one datapath resource.

8. The method for reducing power requirements for a microprocessor in accordance with claim 7, wherein said at least one resource unit is allocated more rapidly than said at least one resource unit is deallocated.

9. The method for reducing power requirements for a microprocessor in accordance with claim 7, wherein said dynamically altering step (c) comprises the sub-step: deallocating at least one discrete resource unit from said at least one datapath resource, and wherein said deallocating sub-step is performed substantially at an end of said update period.

10. The method for reducing power requirements for a microprocessor in accordance with claim 7, wherein said dynamically altering step (c) comprises the sub-step: allocating at least one discrete resource unit to said at least one datapath resource, and wherein said allocating sub-step is performed substantially during said update period, and wherein said update period is terminated upon completion of said allocating said at least one discrete resource unit.

11. The method for reducing power requirements for a microprocessor in accordance with claim 10, wherein said sub-step of allocating at least one discrete resource unit to said at least one datapath resource, comprises starting a new update period.

12. The method for reducing power requirements for a microprocessor in accordance with claim 1, wherein said at least one datapath resource comprises a resource used as a FIFO queue.

13. The method for reducing power requirements for a microprocessor in accordance with claim 1, wherein said at least one datapath resource comprises at least one of the resource types: an IQ, an LSQ, an ROB, a PRF, and an RF.

14. The method for reducing power requirements for a microprocessor in accordance with claim 1, wherein the resource comprises a plurality of subunits, the allocation representing a number of subunits of the resource made available to the microprocessor.

15. The method for reducing power requirements for a microprocessor in accordance with claim 1, the steps further comprising:
e) using said resource allocation requirement estimate to dynamically control a rate of instruction dispatch in said microprocessor.

16. The method for reducing power requirements for a microprocessor in accordance with claim 1, the steps further comprising:
e) using said resource allocation requirement estimate to selectively adjust a clock rate to at least one of the microprocessor components.

17. The method for reducing power requirements for a microprocessor in accordance with claim 16, wherein the clock rate of a microprocessor execution unit is adjusted.

18. The method for reducing power requirements for a microprocessor in accordance with claim 16, wherein the clock rate of a microprocessor instruction cache is adjusted.

19. The method for reducing power requirements for a microprocessor in accordance with claim 16, wherein the clock rate of at least one microprocessor register file is adjusted.

20. The method for reducing power requirements for a microprocessor in accordance with claim 1, the steps further comprising:
e) using said resource allocation requirement estimate to selectively adjust a supply voltage to at least one of the microprocessor components.

21. The method for reducing power requirements for a microprocessor in accordance with claim 20, the steps further comprising:
f) using said resource allocation requirement estimate to selectively adjust a clock rate to at least one of the microprocessor components.

22. A method for reducing power requirements for a processor, comprising the steps of:
a) providing within a processor at least one datapath resource whose allocation may be dynamically altered;
b) dynamically estimating an allocation requirement for said at least one datapath resource responsive to a need therefore by a program being executed within said processor;
c) dynamically altering the allocation of said at least one datapath resource responsive to said allocation requirement estimate;
d) reducing power consumption from an unused portion of said at least one datapath resource; and
e) using said allocation requirement estimate to selectively adjust a clock rate to at least one of the processor components.

23. The method according to claim 22, wherein the clock rate of at least one processor register file is adjusted.

24. The method according to claim 22, wherein said at least one datapath resource comprises at least one discrete resource unit which may be selectively allocated and deallocated with respect thereto.

25. The method according to claim 22, wherein said at least one resource unit is allocated more rapidly than said at least one resource unit is deallocated.

26. The method according to claim 22, further comprising the step of:
f) using said resource requirement estimate to dynamically control a rate of instruction dispatch in said processor.

27. The method according to claim 22, wherein the clock rate of a processor execution unit is adjusted.

28. The method according to claim 22, wherein the clock rate of at least one of a processor instruction cache and a data cache is adjusted.

29. A method for reducing power requirements for a processor, comprising the steps of:
a) providing within a processor at least one datapath resource whose allocation may be dynamically altered;

b) dynamically estimating an allocation requirement for said at least one datapath resource responsive to a need therefore by a program being executed within said processor;

c) dynamically altering the allocation of said at least one datapath resource responsive to said allocation requirement estimate;

d) reducing power consumption from an unused portion of said at least one datapath resource; and e) using said allocation requirement estimate to dynamically control a rate of instruction dispatch in said processor.

30. The method according to claim 29, further comprising the step of:

f) using said allocation requirement estimate to selectively adjust a clock rate to at least one of the processor components.

31. The method according to claim 29, wherein said at least one datapath resource comprises at least one discrete resource unit which may be selectively allocated and deallocated with respect thereto.

32. The method according to claim 29, wherein said at least one resource unit is allocated more rapidly than said at least one resource unit is deallocated.

33. A method for reducing power requirements for a processor, comprising the steps of:

a) providing within a processor at least one datapath resource whose allocation may be dynamically altered, said at least one resource unit being allocated more rapidly than said at least one resource unit is deallocated;

b) dynamically estimating an allocation requirement for said at least one datapath resource responsive to a need therefore by a program being executed within said processor;

c) dynamically altering the allocation of said at least one datapath resource responsive to said allocation requirement estimate; and d) reducing power consumption from an unused portion of said at least one datapath resource.

* * * * *